US005958298A

United States Patent [19]

Nagoshi et al.

[11] Patent Number: 5,958,298

[45] Date of Patent: Sep. 28, 1999

[54] ANTI-CORROSIVE DRAINING AGENT AND RINSING PROCESS

[75] Inventors: Eiji Nagoshi; Kozo Kitazawa, both of Wakayama, Japan

[73] Assignee: Kao Corporation, Tokyo, Japan

[21] Appl. No.: 08/540,978

[22] Filed: Oct. 11, 1995

[30] Foreign Application Priority Data

Oct. 13, 1994 [JP] Japan .................................... 6-275715

[51] Int. Cl.$^6$ .............................. C09K 3/00; C11D 14/02

[52] U.S. Cl. .......................... 252/392; 252/357; 510/264; 510/265; 510/267; 510/401

[58] Field of Search .................................... 252/392, 357; 106/14.15; 510/264, 265, 267, 401; 430/256

[56] References Cited

U.S. PATENT DOCUMENTS

| | | | |
|---|---|---|---|
| 4,786,578 | 11/1988 | Nesius et al. | 430/256 |
| 4,824,762 | 4/1989 | Kobayashi et al. | 430/258 |
| 5,290,472 | 3/1994 | Michael | 252/170 |
| 5,527,468 | 6/1996 | Boyette et al. | 210/698 |
| 5,554,320 | 9/1996 | Yianakopoulos | 252/389.23 |
| 5,597,676 | 1/1997 | Honda et al. | 430/331 |

FOREIGN PATENT DOCUMENTS

| | | |
|---|---|---|
| 5-103903 | 4/1993 | Japan . |
| 6-299200 | 10/1994 | Japan . |

OTHER PUBLICATIONS

English Abstract of JP 6–299200 dated Oct. 25, 1994.

English Abstract of JP 5–103903 dated Apr. 27, 1993.

*Primary Examiner*—Jacqueline V. Howard

*Attorney, Agent, or Firm*—Birch, Stewart, Kolasch & Birch, LLP

[57] ABSTRACT

The anti-corrosive draining agent for use in a rinsing process includes a polyoxyalkylene alkyl ether as an essential component. The anti-corrosive draining agent further includes an amine compound as an essential component, wherein the polyoxyalkylene alkyl ether (a) and the amine compound (b) are contained in a blending weight ratio (a/b) of from 99/1 to 80/20. The rinsing process using water following a cleaning process, includes the steps of adding the above anti-corrosive draining agent to a rinsing water, and rinsing an object in the rinsing water.

7 Claims, No Drawings

ANTI-CORROSIVE DRAINING AGENT AND RINSING PROCESS

FIELD OF THE INVENTION

The present invention is directed to an anti-corrosive draining agent which is used in a rinsing process with water, particularly in the final rinsing process preceding the drying process, the rinsing process following the process for cleaning various parts including electronic parts, metal parts, precision parts, and optical parts, such as glass and lenses, with an alcohol-base detergent, a hydrocarbon detergent, or an aqueous detergent containing surfactants with or without alkalis. By using the anti-corrosive draining agent, the draining time for water adhered onto the surface of the various parts is readily shortened, thereby reducing drying time and energy costs for dryer, and also the occurrence of water spots after drying and the corrosion of metal parts can be prevented, and the draining agent components volatilize so as not to remain on the surface of various parts upon drying. The present invention also relates to a rinsing process using the anti-corrosive draining agent.

BACKGROUND OF THE RELATED ART

Conventionally, the detergents mainly containing chlorofluorocarbon solvents, such as 1,1,2-trichloro-1,2,2-trifluoroethane, and chlorine-based solvents, such as trichloroethylene, perchloroethylene, trichloroethane, and ethylene chloride, have been used for the above parts. However, chlorine-based solvents and chlorofluorocarbon solvents have problems such as toxicity to humans, environmental pollutions such as water and soil pollutions, global warming, and ozone layer depletion. As a result, the cleaning process using these solvents are now being replaced with the method using aqueous detergents. However, the cleaning process using aqueous detergents consumes more time and energy in the drying process when compared with those methods using the above solvents.

Recently, in view of solving the problems attributed to aqueous detergents in the drying process, various methods have been proposed. For example, it is generally known to use a hot-air dryer as a dryer, but this method requires a long drying time. Therefore, high-pressure air blowing and vacuum drying are used together in combination with the hot-air dryer to shorten the drying time. Examples of methods employing draining agents include those using solvents, such as 2-propanol, those using fluorocarbon solvents, such as perfluorocarbon, those using fluorine-containing surfactants thinly to be adsorbed to the surface of the parts to repel rinsing water, and those using nonionic surfactants.

However, the above methods have the following problems. The high-pressure air blowers and vacuum dryers as mentioned above need large-scaled apparatuses, thereby making them too costly. The method using solvents requires anti-explosion facilities, thereby making its handling and maintenance complicated. The method of using a fluorocarbon solvent is costly. The method of using a fluorine-containing surfactant is effective for cleaning flat plates, but its effectiveness becomes poor for cleaning an object having a complicated shape because of remaining waterdrops on the surface. The method using the fluorine-containing surfactant also has the problem that the surfactant remains on the surface of various parts after drying, thereby making it unsuitable to be used for objects which need post-treatments, such as painting. The method using nonionic surfactants is relatively effective for cleaning an object having a complicated shape, but the nonionic surfactants remaining on the surface of the cleaning object sometimes produce stains on the surface.

SUMMARY OF THE INVENTION

An object of the present invention is to provide a anti-corrosive draining agent which is used in the water-rinsing process following the process for cleaning various parts, including electronic parts, metal parts, precision parts, and optical parts, such as glass and lenses, are cleaned with alcohol-base detergents, hydrocarbon detergents, or aqueous detergents containing surfactants with or without alkalis. The inventive anti-corrosive draining agent has excellent safety free from causing environmental pollutions; has good water-drainability; prevents the surface from having water spots after drying; prevents the metal parts from being corroded; and allows volatilization of the components of the draining agent in the drying process, thereby having a smaller amount of the components remaining on the surface of the parts.

Another object of the present invention is to provide a rinsing method using the above anti-corrosive draining agent.

As a result of intensive studies in view of the above problems, the present inventors found that by using a particular polyoxyalkylene alkyl ether, or for the purposes of enhancing the drainability and the anti-corrosivity by using the polyoxyalkylene alkyl ether together with an amine compound, a desired draining agent of the present invention is obtained. Based upon the above finding, the present invention has been completed.

The gist of the present invention is as follows:

(1) An anti-corrosive draining agent for use in a rinsing process, comprising a polyoxyalkylene alkyl ether as an essential component;

(2) The anti-corrosive draining agent described in (1) above, further comprising an amine compound as an essential component, wherein said polyoxyalkylene alkyl ether (A) and said amine compound (B) are contained in a blending weight ratio (A/B) of from 99/1 to 80/20;

(3) A rinsing process using water following a cleaning process, comprising the steps of adding the anti-corrosive draining agent described in (1) above to a rinsing water in an amount of the polyoxyalkylene alkyl ether (A) of from 0.1 to 10% by weight of the rinsing water, and rinsing an object in the rinsing water; and (4) A rinsing process using water following a cleaning process, comprising the steps of adding the anti-corrosive draining agent described in (2) above to a rinsing water in a total amount of the polyoxyalkylene alkyl ether (A) and the amine compound (B) of from 0.1 to 10% by weight of the rinsing water, and rinsing an object in the rinsing water.

DETAILED DESCRIPTION OF THE INVENTION

The anti-corrosive draining agent of the present invention comprises a polyoxyalkylene alkyl ether (Component a) as an essential component. For the purposes of enhancing the drainability and the anti-corrosivity, the draining agent of the present invention may comprise Component a above and an amine compound (Component b) as essential components in a blending weight ratio (a/b) of from 99/1 to 80/20, preferably from 97/3 to 85/15, more preferably from 95/5 to 90/10. When the blending weight ratio of Component b exceeds 80/20, the water-drainability tends to be impaired. When the blending weight ratio of Component b is less than 99/1, sufficient anti-corrosivity cannot be obtained.

A preferred example of the polyoxyalkylene alkyl ethers used as Component a is represented by the following general formula (I):

$$R^1O(AO)_mR^2 \quad (I)$$

wherein $R^1$ represents a hydrocarbon group having 1 to 8 carbon atoms; A represents an alkylene group having 2 to 4 carbon atoms; m represents an average molar addition number of oxyalkylene group, m being a number of from 1 to 4; and $R^2$ represents a hydrogen atom or a hydrocarbon group having 1 to 8 carbon atoms.

In the general formula (I), $R^1$ represents a hydrocarbon group having 1 to 8 carbon atoms, preferably a hydrocarbon group having 3 to 6 carbon atoms. When $R^1$ has more than 8 carbon atoms, solubility in water becomes poor and viscosity is increased, thereby making its working efficiency poor. "A" represents an alkylene group having 2 to 4 carbon atoms, preferably an alkylene group having 2 to 3 carbon atoms. m represents an average molar addition number of oxyalkylene group, m being a number of from 1 to 4, preferably from 2 to 4. When m exceeds 4, viscosity is increased, thereby making its working efficiency poor. $R^2$ represents a hydrogen atom or a hydrocarbon group having 1 to 8 carbon atoms. In terms of its solubility to water, $R^2$ is particularly preferably a hydrogen atom.

The polyoxyalkylene alkyl ethers as set forth above are obtained by adding a liquid or gaseous alkylene oxide having 2 to 4 carbon atoms, such as ethylene oxide, propylene oxide, and butylene oxide, to an alcohol having 1 to 8 carbon atoms and carrying out the reaction in the presence of a catalyst such as caustic alkali under heating conditions, in which terminal hydroxyl group of the resulting product may be further alkylated using an alkylating agent, such as alkyl chlorides. Here, two or more alkylene oxides may be blended to carry out random addition polymerization, or they may be sequentially added by carrying out a block addition polymerization. The polyoxyalkylene alkyl ethers thus obtained are purified by removing unchanged substances and the catalyst used, to be used as Component a.

Examples of the alcohols having 1 to 8 carbon atoms used in the production of Component a mentioned above include methanol, ethanol, n-propanol, butanol, hexanol, octanol, 2-ethylhexanol, cyclohexanol, and benzyl alcohol.

Among the compounds used as Component a, a particular preference is given to glycol ethers, including ethylene glycol monohexyl ether, ethylene glycol monophenyl ether, diethylene glycol monohexyl ether, dipropylene glycol monopropyl ether, dipropylene glycol monobutyl ether, tripropylene glycol monobutyl ether, diethylene glycol butyl methyl ether, dipropylene glycol dibutyl ether, dipropylene glycol isopropyl methyl ether, and dipropylene glycol isopropyl ethyl ether.

The compounds of Component a may be used singly or in combination of two or more kinds.

In the anti-corrosive draining agent of the present invention, the polyoxyalkylene alkyl ether of Component a has an effective water-drainability by itself, but its effect can further be improved by combining it with an amine compound of Component b. By this combination, not only water-draininability is enhanced, but also anti-corrosivity to metal is additionally obtained.

The amine compounds of Component b are preferably compounds having 1 to 5 nitrogen atoms and a molecular weight of from 50 to 200, more preferably compounds having 1 to 3 nitrogen atoms and a molecular weight of from 70 to 150. When the molecular weight is less than 50, it tends to become difficult to achieve an effective drainability and anti-corrosive effect. When the molecular weight exceeds 200, the compound tends to become less volatile upon drying, thereby remaining on the surface of the parts.

Examples of the amine compounds of Component b include amino alcohols, such as monoethanolamine, diethanolamine, triethanolamine, dimethylethanolamine, dibutylethanolamine, aminoethylethanolamine, methylethanolamine, and methyldiethanolamine; alkoxypropylamines, such as 3-(2-ethylhexyloxy)-propylamine, 3-ethoxypropylamine, and 3-methoxypropylamine; morpholines, such as morpholine, methylmorpholine, ethylmorpholine, and 3-aminopropylmorpholine; and other amines, such as piperazine, triethyldiamine, pentamethyldiethylenetriamine, and tetramethylpropylenediamine. Also, the compounds obtained by adding an alkylene oxide, such as ethylene oxide, propylene oxide, and butylene oxide, to the amines mentioned above, or carbonates obtained by the reaction of the amines and carbonic acids are included in the examples of Component b.

The anti-corrosive draining agent of the present invention may be blended with fluorocarbon surfactants, such as fluorine-based alcohols, carboxylic acids, or carboxylic acid esters, each having a molecular weight of not more than 400, in order to reduce the surface tension. When the molecular weight exceeds 400, the volatility becomes low, thereby causing the compounds remaining on the surface of the parts.

The anti-corrosive draining agent of the present invention comprises various components as mentioned above. In terms of boiling point, the anti-corrosive draining agent of the present invention preferably contains compounds with a boiling point at 1 atm of from 100 to 350° C., preferably from 150 to 300° C., in an amount of not less than 50% by weight. When the boiling point is less than 100° C., there may be a risk of catching fire upon use. When the boiling point exceeds 350° C., the compounds tend to remain on the surface of the parts even after the drying process.

The anti-corrosive draining agent of the present invention is preferably added to a final rinsing vessel of a series of rinsing vessels so as not to impair the good drainability, anti-corrosivity, and the non-residual properties.

The anti-corrosive draining agent of the present invention is added in the rinsing process, so that it is suitably used in the rinsing process of the present invention. Specifically, the rinsing process of the present invention comprises the steps of adding the above-mentioned anti-corrosive draining agent in an amount of the polyoxyethylene alkyl ether (a) or in a total amount the polyoxyethylene alkyl ether (a) and the amine compound (b) of from 0.1 to 10% by weight, preferably of from 0.5 to 5% by weight, of the rinsing water, and rinsing an object in the rinsing water. Here, in the case where Component a is singly used, the amount of the polyoxyethylene alkyl ether (a) is in the above ranges, and in the case where Components a and b are used in combination, the total amount of the polyoxyethylene alkyl ether (a) and the amine compound (b) is in the above ranges.

When the amount is less than 0.1% by weight, the effect of decreasing the surface tension of water is lowered, so that the water-drainability is liable to be impaired, and anti-corrosivity is also liable to be impaired. When the amount exceeds 10% by weight, the components do not uniformly dissolve in water. Also, the components tend to become less volatile, thereby remaining on the surface of the parts even after the drying process. Incidentally, a suitable draining process can be carried out by draining after the rinsing process.

For the reasons set forth above, the rinsing process of the present invention may be preferably conducted such that the adding step and the rinsing step are carried out in the final rinsing vessel of a series of rinsing vessels.

Here, the cleaning is usually carried out using alcohol-based detergents, hydrocarbon detergents, or aqueous detergents containing surfactants with or without alkalis. The anti-corrosive draining agent of the present invention is used in the rinsing process following the cleaning process as mentioned above. Upon use, the anti-corrosive draining agent is diluted with water so as to give the above-mentioned concentration. By such dilution, excellent drainability and volatility can be achieved.

Therefore, the anti-corrosive draining agent having a surface tension of not more than 40 dyn/cm, preferably not more than 35 dyn/cm, after dilution (or upon rinsing) shows excellent drainability.

In order to cut back expenses for transporting and saving storage space, the anti-corrosive draining agent of the present invention will be usually diluted upon use. Alternatively, it may be previously prepared to have a given concentration mentioned above.

The concrete procedures of the rinsing processes of the present invention are not particularly limited. For instance, an object to be rinsed may be immersed in a solution of the anti-corrosive draining agent of the present invention having the above-mentioned concentration with or without an ultrasonic wave application. Alternatively, an object to be rinsed may be subjected to in-liquid jetting or in-air spraying.

The anti-corrosive draining agent and the rinsing process of the present invention can give excellent water-drainability for electronic parts, electrical parts, metal industrial parts, precision instrument parts, formed resinous parts, optical parts, etc. Here, examples of the electronic parts include printed wiring boards for use in electronics-aided instruments such as computers and peripheral devices thereof, domestic electrical instruments, communications instruments, OA instruments, and the like; hoop materials for use in contact parts such as IC lead frames, resistors, capacitors, relays, and the like; liquid crystal displays for use in OA instruments, clocks, computers, toys, domestic electrical instruments, and the like; magnetic recording parts for use in recording-reproduction of image or sound and related parts thereof; semiconductive materials such as silicon or ceramic wafers and the like; electrostriction parts such as quarts oscillators and the like; and photoelectric transformer parts for use in CD, PD, copying instruments, optical recording instruments, and the like. Examples of the electrical parts include motor equipment parts such as brushes, rotors, stators, housings, and the like; ticket vending parts for use in vending machines and various other instruments; and coin-checking parts for use in vending machines, cash dispensers and the like. Examples of the metal industrial parts include parts for use in transportation gears, home-appliance parts, and metal working parts. Example of the precision instrument parts include bearings for use in precision drivers, video recorders, and the like; and parts for use in working such as cemented carbide chips and the like. Examples of the formed resin parts include precision resin parts for use in cameras, cars and the like; and molded resinous products such as urethan sole. Examples of the optical parts include glass or plastic lenses for use in cameras, eyeglasses, optical instruments, and the like, in addition to other related parts such as spectacle rims, clock housings, watch bands, and the like.

According to the present invention, by using the anti-corrosive draining agent, the draining time for water adhered onto the surface of the various parts is readily shortened, thereby reducing drying time and energy costs for dryer, the occurrence of water spots after drying and corrosion of metal parts can be prevented, and the draining agent components volatilize so as not to remain on the surface of various parts upon drying.

EXAMPLES

The present invention will be explained in further detail by means of the following working examples and comparative examples, without intending to limit the scope of the present invention thereto.

EXAMPLES 1 TO 17 AND COMPARATIVE EXAMPLES 1 TO 4

Anti-corrosive draining agents having the compositions listed in Tables 1 and 2 were prepared, and each of the anti-corrosive draining agents was evaluated for drainability, anti-corrosive effect, and residual property according to the following methods.

(1) Drainability (Glass Beads)

In a metal-mesh basket, 600 thoroughly cleaned glass beads with a diameter of 5.2 mm were placed. Then, the metal-mesh basket was immersed in an aqueous solution with a concentration of each anti-corrosive draining agent listed in Tables 1 and 2 for one minute, and pulled out from the aqueous solution. The weight of the metal-mesh basket after 30 seconds after taking it out from the aqueous solution was measured as well as that before immersion, and the amount of water adhered (g) was obtained by calculating the difference in the above weights, as given below:

| Amount of Water | | Weight of Basket | | Weight of Basket |
|---|---|---|---|---|
| Adhered (g) | = | After 30 Seconds After Taking It Out from the Aqueous Solution | - | Before Immersion |

(Copper plate)

Five copper plates (length 75 mm, width 25 mm, and thickness 5 mm), each having 6 holes with 4 mm diameter, were prepared. Each of the plates was stacked via a 0.5 mm washer placed between each plate. The plates were bolted with two nuts of 40 mm length at two of the holes on the plates, to prepare a test piece. The test piece was thoroughly cleaned and then immersed for one minute in an aqueous solution of each of the anti-corrosive draining agents with the concentrations listed in Tables 1 and 2. The weight of the metal-mesh basket after 30 seconds after taking it out from the aqueous solution was measured as well as that before immersion, and the amount of water adhered (g) was obtained by calculating the difference in the above weights by the equation given above for drainability of glass beads.

(2) Anti-Corrosive Effect

Twenty-five ml of each of the aqueous solution of the anti-corrosive draining agents diluted to a concentration listed in Tables 1 and 2 was placed in a 50-ml beaker. Each of the cold rolled steel sheets (according to JIS G 3141) having 40 mm length, 30 mm width, and 1 mm thickness was subjected to a degreasing treatment with carbon tetrachloride and immersed to the above aqueous solution, so as to have only a half of the steel sheets immersed therein. The beaker was placed in a thermostat kept at 60° C. for one hour, and the surface conditions were visually evaluated to check on the extent of generation of corrosion (rust).

Evaluation standards for the anti-corrosive effects were as follows:

○: No rust was generated.

Δ: Rust was partially generated.

x: Rust was generated on the entire surface.

(3) Residual property

Copper plates used for evaluating drainability were dried at 80° C. for 10 minutes, and the residual property and water spots after drying were evaluated by weight analysis and visual inspection.

Evaluation standards for the residual amounts were as follows:

◎: The residual amount is 0, and water spots after drying, cloudiness, etc. were not observed at all.

○: The residual amount is 0, and water spots after drying was not observed.

Δ: The residual amount is 0, but water spots after drying was observed.

x: Some residuals were observed.

The results are shown in Tables 1 and 2.

TABLE 1

| Components for Anti-Corrosive Draining Agent (% by weight) | | Example Nos. 1 | 2 | 3 | 4 | 5 | 6 | 7 | 8 | 9 | 10 | 11 |
|---|---|---|---|---|---|---|---|---|---|---|---|---|
| Glycolethers | | | | | | | | | | | | |
| $C_3H_7O(PO)_2H$ | | | | | | | | | | | | |
| $C_4H_9O(EO)_2H$ | | 90 | | | | | | | | | | 90 |
| $C_4H_9O(EO)_2(PO)_2H$ | | | 90 | | | | | | | 80 | 80 | |
| $C_6H_{13}O(EO)_2H$ | | | | 90 | | | | | | | | |
| $C_8H_{17}O(EO)_4H$ | | | | | 90 | | | 90 | 90 | | | |
| $C_4H_9O(EO)_2CH_3$ | | | | | | 85 | | | | | | |
| $C_4H_9O(EO)_6H$ | | | | | | | 90 | | | | | |
| $C_{10}H_{21}O(EO)_4H$ | | | | | | | | | | | | |
| Sorbitan Monooleate$(EO)_{20}$ | | | | | | | | | | | | |
| $HO(PO)_{16}(EO)_{15}H$ | | | | | | | | | | | | |
| Amines | | | | | | | | | | | | |
| Methyldiethanolamine | | 10 | 10 | 10 | 10 | 15 | 10 | | | 20 | | 5 |
| Ethoxypropylamine | | | | | | | | 10 | | | 20 | |
| 3-Aminopropylmorpholine | | | | | | | | | 10 | | | 5 |
| Tap water | | | | | | | | | | | | |
| Concentration of Aqueous Solution (%) | | 1 | 1 | 0.5 | 1 | 1 | 1 | 1 | 1 | 5 | 10 | 1 |
| Evaluation Tests | | | | | | | | | | | | |
| Drainability (g) | Glass Beads | 3.0 | 2.7 | 2.2 | 2.0 | 2.5 | 1.8 | 1.9 | 1.8 | 2.5 | 3.2 | 1.8 |
| | Copper Plates | 1.4 | 1.3 | 1.0 | 0.9 | 1.3 | 0.8 | 0.9 | 0.8 | 1.4 | 1.5 | 0.9 |
| Anti-Corrosive Effect | | ○ | ○ | ○ | ○ | ○ | ○ | ○ | ○ | ○ | ○ | ○ |
| Residual Property | | ◎ | ◎ | ◎ | ◎ | ◎ | ◎ | ◎ | ◎ | ○~◎ | ○ | ◎ |

In Table, (EO) stands for ethylene oxide, and (PO) stands for propylene oxide.

TABLE 2

| Components for Anti-Corrosive Draining Agent (% by weight) | Example Nos. 12 | 13 | 14 | 15 | 16 | 17 | Comparative Example Nos. 1 | 2 | 3 | 4 |
|---|---|---|---|---|---|---|---|---|---|---|
| Glycolethers | | | | | | | | | | |
| $C_3H_7O(PO)_2H$ | 25 | | 40 | | | | | | | |
| $C_4H_9O(EO)_2H$ | | 20 | | | | 50 | | | | |
| $C_4H_9O(EO)_2(PO)_2H$ | | | | | | | | | | |
| $C_6H_{13}O(EO)_2H$ | 70 | 70 | | 70 | 100 | | | | | |
| $C_8H_{17}O(EO)_4H$ | | | | | | | | | | |
| $C_4H_9O(EO)_2CH_3$ | | | | | | 50 | | | | |
| $C_4H_9O(EO)_6R$ | | | | | | | | | | |
| $C_{10}H_{21}O(EO)_4H$ | | | 50 | | | | | | | |
| Sorbitan Monooleate$(EO)_{20}$ | | | | | | | | | 100 | 90 |
| $HO(PO)_{16}(EO)_{15}H$ | | | | | | | | 100 | | |
| Amines | | | | | | | | | | |
| Methyldiethanolamine | 5 | 5 | 10 | | | | | | | 10 |
| Ethoxypropylamine | | 5 | | 30 | | | | | | |
| 3-Aminopropylmorpholine | | | | | | | | | | |
| Tap water | | | | | | | 100 | | | |
| Concentration of Aqueous Solution (%) | 1 | 1 | 1 | 5 | 1 | 1 | 0 | 1 | 1 | 1 |

TABLE 2-continued

| Components for Anti-Corrosive Draining Agent (% by weight) | | Example Nos. 12 | 13 | 14 | 15 | 16 | 17 | Comparative Example Nos. 1 | 2 | 3 | 4 |
|---|---|---|---|---|---|---|---|---|---|---|---|
| Evaluation Tests | | | | | | | | | | | |
| Drainability (g) | Glass Beads | 1.8 | 1.7 | 3.5 | 3.8 | 3.4 | 3.7 | 6.9 | 6.2 | 5.7 | 5.5 |
| | Copper Plates | 1.0 | 0.8 | 1.6 | 1.7 | 1.5 | 1.6 | 1.8 | 1.8 | 1.7 | 1.7 |
| Anti-Corrosive Effect | | ○ | ○ | ○ | ○ | Δ | Δ | X | X | X | ○ |
| Residual Property | | ◎ | ◎ | ○ | ○ | ◎ | ◎ | Δ | X | X | X |

As is clear from Tables 1 and 2, in the case of Example 1 through 17 where the anti-corrosive draining agents of the present invention were used, the drainability and residual property were both excellent, and particularly in the case of Examples 1 to 15 where the amine compounds are included, the drainability and the anti-corrosive effects were further enhanced.

On the other hand, the following cases had poor drainability and also poor anti-corrosivity and/or residual property: The case of Comparative Example 1 where rinsing was carried out with water alone; the case of Comparative Example 2 where Pluronic-type nonionic surfactant was used; the case of Comparative Example 3 where polyoxyethylene sorbitan monooleate was used; and the case of Comparative Example 4 where amine compound was further added to the case of Comparative Example 3.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rinsing process using water in a series of rinsing vessels following a cleaning process wherein the rinsing process comprises the steps of adding an anti-corrosive draining agent composition comprising a polyoxyalkylene alkyl ether represented by the following general formula (I):

$$R_1O(AO)_mR^2 \quad (I)$$

wherein $R^1$ represents a hydrocarbon group having 1 to 8 carbon atoms; A represents an alkylene group having 2 to 4 carbon atoms; m represents an average molar addition number of oxyalkylene group, m being a number of from 1 to 4; and $R^2$ represents a hydrogen atom or a hydrocarbon group having 1 to 8 carbon atoms; to rinsing water in a final rinsing vessel in an amount of said polyoxyalkylene alkyl ether of from 0.1 to 10% by weight of the rinsing water; and rinsing an object in the rinsing water.

2. A rinsing process using water in a series of rinsing vessels following a cleaning process, wherein the rinsing process comprises the steps of adding an anti-corrosive draining agent composition comprising a polyoxyalkylene alkyl ether represented by the following general formula (I):

$$R^1O(AO)_mR^2 \quad (I)$$

wherein $R^1$ represents a hydrocarbon group having 1 to 8 carbon atoms; A represents an alkylene group having 2 to 4 carbon atoms; m represents an average molar addition number of oxyalkylene group, m being a number of from 1 to 4; and $R^2$ represents a hydrogen atom or a hydrocarbon group having 1 to 8 carbon atoms; and an amine compound to rinsing water in a final rinsing vessel in a total amount of said polyoxyalkylene alkyl ether and said amine compound of from 0.1 to 10% by weight of the rinsing water; and rinsing an object in the rinsing water.

3. The process according to claim 2, wherein a blending weight ratio of said polyoxyalkylene alkyl ether to said amine compound is from 99/1 to 80/20.

4. The process according to claim 2, wherein said amine compound is a compound having 1 to 5 nitrogen atoms and a molecular weight of from 50 to 200.

5. The process according to claim 2, wherein said amine compound is one or more selected from the group consisting of an amino alcohol, an alkoxypropylamine, a morpholine, a piperazine, triethyldiamine, pentamethyldiethylenetriamine, tetramethylpropylenediamine, a compound obtained by adding an alkylene oxide to one of aforesaid amines, and a reaction product of one of aforesaid amines with carbonic acid.

6. A rinsing process using water in a series of rinsing vessels following a cleaning process wherein the rinsing process comprises the steps of adding an anti-corrosive draining agent composition comprising a polyoxyalkylene alkyl ether represented by the following general formula (I):

$$R^1O(AO)_mR^2 \quad (I)$$

wherein $R^1$ represents a hydrocarbon group having 1 to 8 carbon atoms; A represents an alkylene group having 2 to 4 carbon atoms; m represents an average molar addition number of oxyalkylene group, m being a number of from 1 to 4; and $R^2$ represents a hydrogen atom or a hydrocarbon group having 1 to 8 carbon atoms; to rinsing water in a final rinsing vessel in an amount of said polyoxyalkylene alkyl ether of from 0.1 to 10% by weight of the rinsing water; and rinsing an object in the rinsing water;

wherein the cleaning process comprises applying to the object an alcohol-base detergent, hydrocarbon detergent, or an aqueous detergent containing surfactants with or without alkalis.

7. A rinsing process using water in a series of rinsing vessels following a cleaning process wherein the rinsing process comprises the steps of adding an anti-corrosive draining agent composition comprising a polyoxyalkylene alkyl ether represented by the following general formula (I):

$$R^1O(AO)_mR^2 \quad (I)$$

wherein $R^1$ represents a hydrocarbon group having 1 to 8 carbon atoms; A represents an alkylene group having 2 to 4 carbon atoms; m represents an average molar addition number of oxyalkylene group, m being a number of from 1 to 4; and $R^2$ represents a hydrogen atom or a hydrocarbon group having 1 to 8 carbon atoms; to rinsing water in a final rinsing vessel in an amount of said polyoxyalkylene alkyl ether of from 0.1 to 10% by weight of the rinsing water; and rinsing an object in the rinsing water; and wherein the object is selected from the group consisting of metal industrial parts, electrical parts, precision instrument parts, formed resinous parts, optical parts, wiring boards, hoop materials, liquid crystal displays, magnetic recording parts, electrostriction parts, and photoelectric transformer parts.

* * * * *